United States Patent [19]
Turbin

[11] 3,792,572
[45] Feb. 19, 1974

[54] APPARATUS FOR DEHUMIDIFYING AND DILUTING A WET GAS STREAM

[75] Inventor: Kenneth L. Turbin, Midland, Mich.

[73] Assignee: The Dow Chemical Company, Midland, Mich.

[22] Filed: June 2, 1972

[21] Appl. No.: 259,291

[52] U.S. Cl. .................. 55/269, 55/459, 62/93, 165/111
[51] Int. Cl. ............................ B01d 53/26
[58] Field of Search 62/93; 165/110, 111, 112, 113; 55/267, 268, 269, 80, 468

[56] References Cited
UNITED STATES PATENTS

| 3,572,010 | 3/1971 | Dupps | 165/111 X |
| 3,592,122 | 7/1971 | Hughes | 55/267 X |
| 3,543,843 | 12/1970 | Gunter | 165/113 X |
| 3,587,243 | 6/1971 | Keller et al. | 62/93 X |

*Primary Examiner*—Albert W. Davis, Jr.
*Assistant Examiner*—S. J. Richter
*Attorney, Agent, or Firm*—V. Dean Clausen

[57] ABSTRACT

An apparatus is disclosed in which a wet gas effluent stream at a high temperature is dehumidified before discharging the stream to the atmosphere. The wet gas is passed through a heat exchanger positioned in a main chamber. Simultaneously, the wet gas stream is cooled by an ambient temperature air stream which is drawn into the main chamber and forced past the heat exchanger. The condensate in the cooled wet stream is removed in a second chamber and the remaining gas phase is dispersed back into a mixing compartment of the main chamber. In the mixing compartment the gas phase of the effluent stream mixes with the ambient air, which dilutes the effluent and reduces its humidity, before the stream is discharged to the atmosphere. Dehumidifying the effluent stream before discharge to the atmosphere reduces the tendency of the effluent to form fog plumes and also avoids any drizzle precipitation.

1 Claim, 3 Drawing Figures

3,792,572

APPARATUS FOR DEHUMIDIFYING AND DILUTING A WET GAS STREAM

BACKGROUND OF THE INVENTION

The invention relates broadly to dehumidification of a wet gas stream. More specifically, the invention pertains to an apparatus and method for removing water vapor from an effluent gas stream and lowering the temperature of the stream before discharging the effluent to the atmosphere.

In many industrial operations, effluent gases containing large amounts of water vapor are discharged to the atmosphere at a high temperature. One example is in the use of various types of dryers which are used to remove water from products such as chemicals, food, and paper. Another example is in combustion operations utilizing hydrogenous fuels, in which flue gases may be discharged at temperatures near the dew point. Another example is air pollution control, in which hot gases are passed through water scrubbers to remove contaminating solids or pollutant gases. Large quantities of water vapor are also discharged to the atmosphere from various types of water cooling towers.

In operations of the type described above, the discharge of water vapor to the atmosphere usually presents a common problem. Normally, the effluent gases are saturated with water vapor and the gas is emitted to the atmosphere at a relatively high temperature. As the effluent gas mixes with the cooler atmospheric air, the temperature of the exit gas will usually quickly drop below the dew point temperature. The result is condensation of the water vapor, which creates a fog plume and, in some instances, a drizzle precipitation if the condensing vapor exceeds a certain amount.

Although a fog plume or drizzle precipitation is usually not considered objectionable as an air pollutant, it can be undesirable for other reasons. For example, because of its opacity characteristics, the vapor plume may be aesthetically unattractive. A fog plume can also be hazardous in the vicinity of airports, highways or operating walkways, since it can restrict visibility considerably. Drizzle precipitation can be even more objectionable in that it may corrode nearby metal structures or may cause slippery roadways and walkways, particularly in cold weather.

Attempts to eliminate objectionable fog plumes or drizzle precipitation have included several methods for reducing the water vapor condensate in the exit plume. In one method, hot air is mixed with the moist effluent to change the dew point temperature and prevent the effluent from becoming super-saturated as it mixes with cooler atmospheric gases. A major drawback of this method is that it requires a considerable amount of fuel or other source of energy to heat the air.

Another method involves super heating the plume to a temperature high enough so that the effluent disperses in the atmosphere before it cools to the dew point temperature. A particular disadvantage of this technique is the difficulty in predicting the minimum amount of super heat required. The reason is that present engineering studies do not enable accurate calculation of the relative magnitude of heat and mass transfer coefficients that occur when an effluent mixes with the atmosphere. Another drawback of the super heating method is that it requires costly and complex equipment, such as a combustion chamber and fuel burning equipment in the stack.

In another method the water vapor in the effluent stream is condensed by passing the effluent through a direct contact water-cooled condenser. An undesirable feature of this system is that it requires a fairly large quantity of cooling water. For this reason, unless the operation can utilize a natural body of water, it is necessary to cool and recycle the water through a cooling tower. Another drawback of this system is that heat resulting from condensation of the water vapor ends up in the cooling water. If a body of natural water is used for cooling, therefore, the flow of the cooling liquid must be sufficient to absorb the quantity of heat generated. Otherwise, the result may be thermal pollution of the natural water.

The methods mentioned above and other techniques for reducing water vapor condensation in effluent gas are described by B. B. Crocker in "Water Vapor in Effluent Gases: What To Do About Opacity Problems", Chemical Engineering, pages 109-116 (July 15, 1968).

SUMMARY OF THE INVENTION

In general, the invention provides means for reducing the humidity and lowering the temperature of a wet gas effluent stream before discharging the stream to the atmosphere. The high temperature effluent wet stream to be dehumidified is passed through a heat exchanger means positioned in a first chamber having a mixing compartment therein. Similarly, a stream of ambient air, which is at a lower temperature than the effluent stream, is drawn into the chamber through an air intake means. The incoming air stream is forced past the heat exchanger, so that it cools the effluent stream and condenses some of the water vapor in the effluent stream.

From the heat exchanger, the effluent stream is directed into a second chamber to remove the condensate. Upon separation of the condensate, the gas phase of the dehumidified stream is directed into a sparger means, which disperses it into the mixing compartment of the first chamber. In the mixing compartment the gas phase of the effluent stream mixes with the ambient air stream and the dehumidified mixed stream is discharged into the atmosphere.

DESCRIPTION OF A PREFERRED EMBODIMENT

Figure 1:
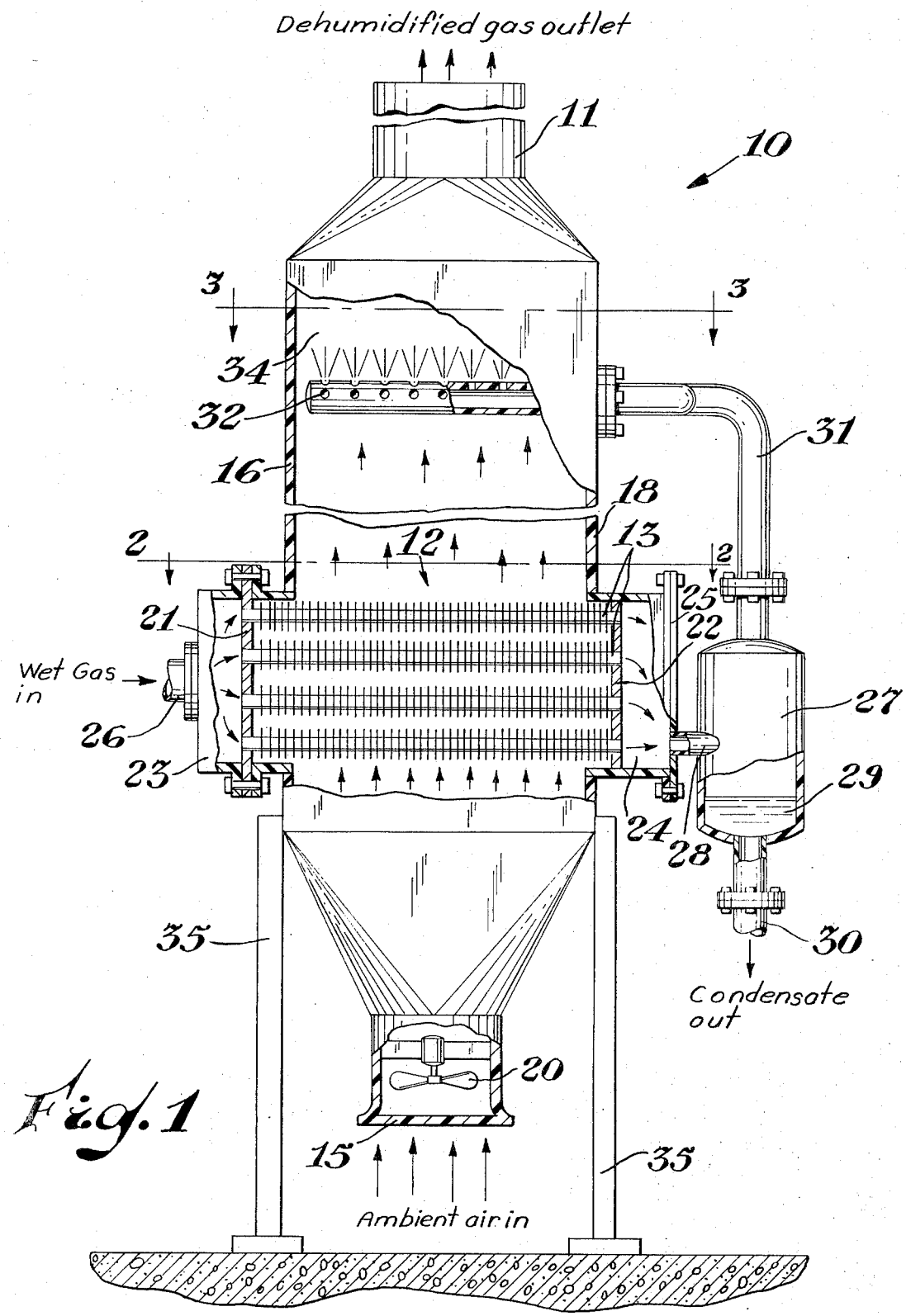
FIG. 1 is a vertical section view of one embodiment of a dehumidifier apparatus of this invention.

In the drawing, referring particularly to FIG. 1, is illustrated one embodiment of a dehumidifier apparatus of this invention. The dehumidifier comprises basically a first chamber, indicated generally by numeral 10, including a vent stack 11 at the top of the chamber. The effluent stream to be dehumidified is carried through the first chamber 10 in a heat exchanger unit, generally indicated by numeral 12. A preferred unit is an extended surface heat exchanger. The unit 12 is made up of a bundle of tubes 13, which are in spaced parallel relation to each other and are open at both ends. Fastened to each tube 13 are spaced-apart fins 14, which provide the extended heat exchanger surface.

The chamber 10 is preferably set in a vertical position, as shown in FIG. 1. In the embodiment of FIG. 1 the heat exchanger unit 12 is positioned horizontally in chamber 10. At the top, chamber 10 tapers inwardly and upwardly to the base of vent stack 11. At the bottom, chamber 10 tapers inwardly and downwardly, with an air intake housing 15 being joined into the tapered portion. Between the upper and lower tapered portions the main body of chamber 10 is a rectangular shape, as defined by side walls 16, 17, 18 and 19 (note FIGS. 2 and 3). Ambient air (outside air) is drawn into chamber 10 by a fan 20, which is mounted in the intake housing 15.

Figure 2:
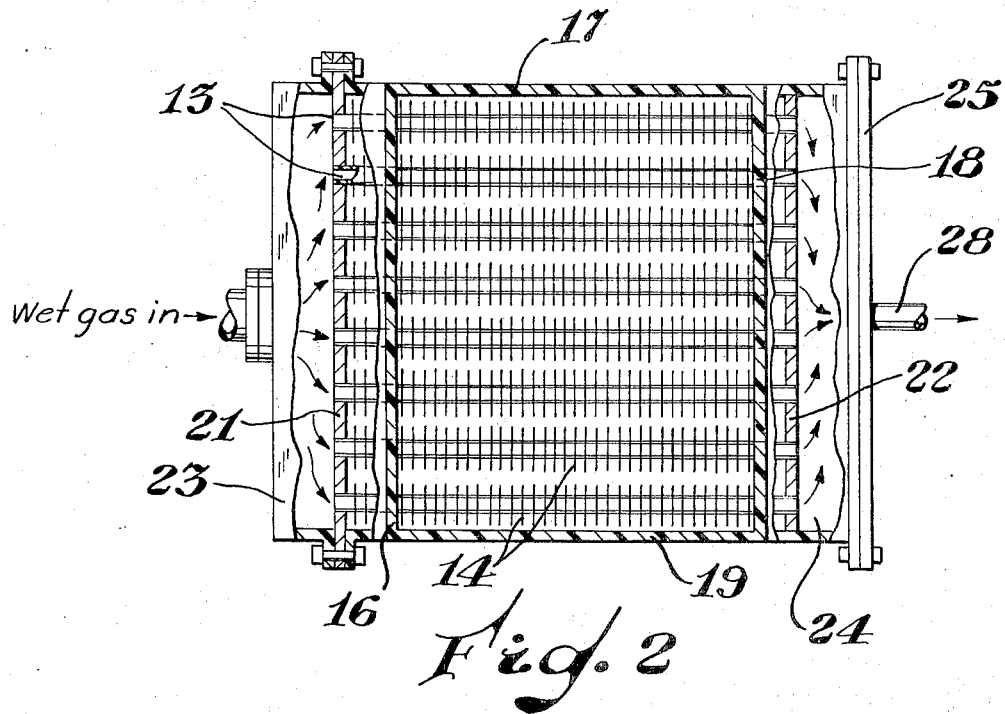
FIG. 2 is a cross section view of the dehumidifier of FIG. 1, as taken on line 2—2.

Referring to the heat exchanger 12, as noted in FIGS. 1 and 2, one end of each tube 13 is fastened into a tube sheet 21 and the opposite end is fastened into a tube sheet 22. The tubes are mounted with the openings in the tube ends being flush with the outside surface of each tube sheet. Tube sheet 21 is fastened into an inlet duct 23, which is mounted on sidewall 16 of chamber 10. An outer segment of duct 23 forms an enclosure over the open ends of the tube bundle. Tube sheet 22 is fastened into an outlet duct 24, which is mounted on sidewall 18 of chamber 10. A cover plate 25, which is fastened over the outer edge of duct 24, forms an enclosure over the opposite open ends of the tube bundle.

Connected into the duct 23 is an inlet line 26, which carries the wet gas stream into duct 23. From duct 23 the wet gas stream passes through the tubes 13 of heat exchanger 12 and into the outlet duct 24. As the wet stream passes through the tube bundle, it is at a relatively high temperature, so that the stream is cooled by the ambient temperature air forced up through the heat exchanger 12 by fan 20. When the wet gas stream is cooled, a portion of the water vapor in the stream condenses and releases latent heat of vaporization. The heat of vaporization thus raises the temperature of the ambient air being forced up through the heat exchanger.

Figure 3:
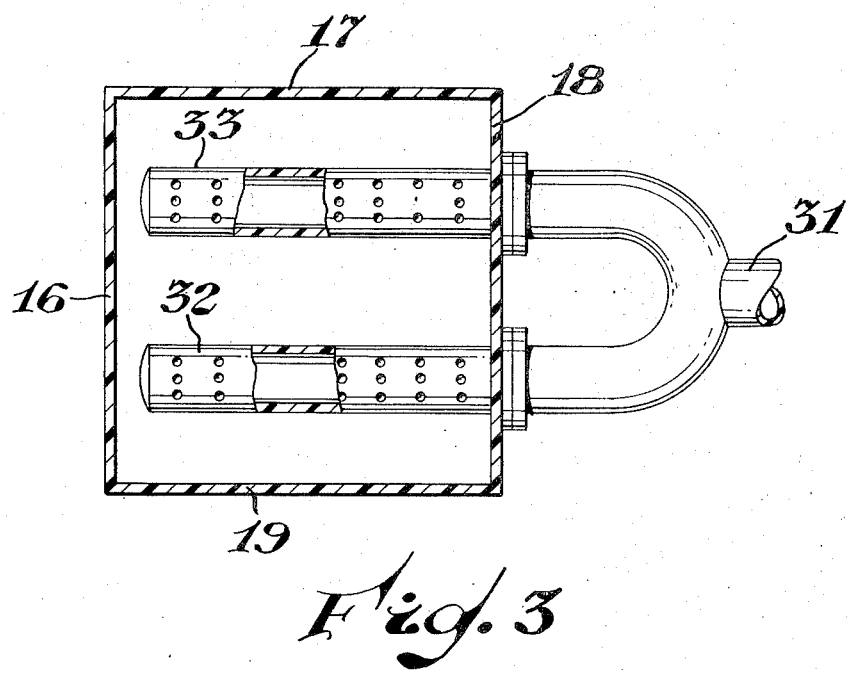
FIG. 3 is a cross section view of the dehumidifier of FIG. 1, as taken on line 3—3.

From outlet duct 24, the dehumidified effluent stream passes into a second chamber 27 through an outlet line 28, which connects the outlet duct with the second chamber. In chamber 27 the condensate 29 collects at the bottom of the chamber and is continuously drawn off through a drain line 30. Connected into the top of chamber 27 is a sparger line 31. As the condensate 29 separates from the effluent stream, the gas phase of the stream which remains rises upwardly through the sparger line 31. As shown in FIGS. 1 and 3, a set of sparger pipes 32 and 33 is positioned in the first chamber 10 above the heat exchanger 12. The sparger pipes are connected into line 31 outside of the side wall 18.

A mixing compartment 34 is defined by that part of chamber 10 which lies between the sparger pipes 32 and 33 and vent stack 11. From sparger pipes 32 and 33, the gas phase of the effluent stream is dispersed into mixing compartment 34. In compartment 34 the gas phase of the effluent mixes with the ambient air stream which passes up through the heat exchanger 12. The mixed gas stream is then discharged into the atmosphere through vent stack 11. Chamber 10 is supported a short distance above ground level by leg members 35.

From studies of atmospheric humidity it is known that water is constantly evaporating into the atmosphere. It is generally accepted, therefore, that the atmosphere always contains a mixture of dry air and water vapor. According to Dalton's law of partial pressure, total atmospheric pressure has two components, namely, the partial pressure due to dry air and the partial pressure due to water vapor. The equation is expressed as follows:

$P = p_a + p_w$ wherein $P$ = total atmospheric pressure
$p_a$ = partial pressure of the dry air
$p_w$ = partial pressure of the water vapor According to the above principle, water will evaporate into the atmosphere until the partial pressure due to the vapor is equal to the vapor pressure of water at the existing temperature. At this point the atmosphere is saturated, that is, it contains the maximum amount of water vapor it can hold at that temperature. Another way of defining the water vapor content in the air at a given temperature is to express it in terms of relative humidity. Relative humidity is defined as the ratio between the water vapor actually present in the air and the amount which will produce saturation at the existing temperature. Saturated air, therefore, has a relative humidity of 100 percent.

When a wet gas stream is discharged to the atmosphere, several factors must be considered in order to lessen the tendency for fog plumes to form and to avoid drizzle precipitation. The principal factors are the temperature and the humidity of the wet gas stream and the temperature of the atmospheric air. The objective in the present invention is to reduce the humidity and lower the temperature of the effluent stream before discharging the stream to the atmosphere. In general, this is accomplished by (1) removing part of the water vapor from the effluent stream, and (2) diluting the dehumidified stream with ambient air.

Basically, the temperature of the effluent stream being discharged is maintained at the desired level by two factors. One factor is the heat transfer capacity of the heat exchanger. A second factor is a predetermined and definite flow rate relation between the wet stream passing through the heat exchanger and the ambient air stream flowing past the heat exchanger. Specifically, the flow rate of the ambient air stream is regulated relative to the flow rate of the wet gas stream, so that at any concentration obtained by partial mixing of the two streams, there is no tendency for water droplets to form. Expressed in another way, the partial pressure of the water vapor at any point in the stream, as the stream is being mixed, is always lower than the vapor pressure for water at the temperature of the mixed stream at that point.

A typical example of the practice of this invention will now be described. The wet gas stream to be dehumidified contains water vapor, air and other non-condensable gases, such as $CO_2$. To avoid excessive plume formation, the water concentration of the system, as vented, is reduced to the concentration at which it would be saturated at 130°F.

The wet gas stream is passed through the heat exchanger 12 at a temperature of about 192.3°F. The flow rate of the wet stream into the heat exchanger is about 32,644 lbs./hr., which comprises about 17,823 lbs./-hr. water vapor and 14,821 lbs/hr. air and non-condensable gases. For this example the ambient air is drawn into the chamber 10 at a temperature of about 15°F. and a flow rate of about 115,343 lbs./hr. As the ambient temperature air is forced past the heat exchanger, the latent heat of vaporization of the condensing wet stream warms the air to an average temperature of about 138°F. The condensate 29, which collects in chamber 27, is drawn off through line 30 at a rate of about 3,481 lbs./hr. The average temperature of the condensate is about 188.7°F.

From sparger pipes 32 and 33, the dehumidified effluent stream is dispersed into mixing compartment 34 at a temperature of about 188.7°F. The flow rate into the sparger pipe is about 29,163 lbs./hr., which comprises about 14,342 lbs./hr. water vapor and 14,821 lbs./hr. air and non-condensable gases. The mixed gas effluent stream in compartment 94 is discharged into the atmosphere through vent stack 11 at a temperature of about 151.3°F. The dishcharge flow rate is about 144,506 lbs./hr., which comprises about 14,342 lbs./hr. water vapor and 130,164 lbs./hr. air and non-condensable gases.

Following are various structural details relating to one embodiment of the dehumidifier, as described and illustrated herein. Understandably, the invention is not limited to the precise details set out herein. The principal material of construction is a commerically available, reinforced, corrosion resistant, vinyl ester resin. Specific parts which are fabricated of the resin material include the first chamber 10, second chamber 27, inlet duct 23, outlet duct 24, outlet line 28, sparger line 31, sparger pipes 32 and 33, and drain line 30. In general, the tube bundle and tube sheets in heat exchanger 12 should be fabricated of various corrosion-resistant metals or metal alloys. In practice, the actual choice of materials will depend primarily on the environment in which the heat exchanger unit is operating.

What is claimed is:
1. Apparatus for reducing the humidity and lowering the temperature of an effluent wet gas stream before discharging the dehumidified gas stream to the atmosphere, which includes:
   a vertically-positioned first chamber having a mixing compartment therein,
   an extended surface heat exchanger which is positioned horizontally within the first chamber below the mixing compartment, for carrying the effluent stream through the first chamber,
   an inlet means in communication with the heat exchanger, for directing the effluent stream into the heat exchanger at a temperature above ambient air temperature,
   an air intake means connected into the first chamber below the heat exchange, for drawing ambient air into the first chamber at a lower temperature than the temperature of the effluent stream and forcing the air stream past the heat exchanger means into the mixing compartment,
   a second chamber in communication with the heat exchanger means, for removing condensate produced in the effluent stream during flow through the heat exchanger means,
   a sparger means in communication with the second chamber and positioned in the mixing compartment of the first chamber, for dispersing the dehumidified effluent stream into the said mixing compartment to thereby mix with the ambient air stream, and
   a vent means connected into the first chamber, for discharging the dehumidified mixed gas stream into the atmosphere.

* * * * *

PO-1050
(5/69)

UNITED STATES PATENT OFFICE
CERTIFICATE OF CORRECTION

Patent No. 3,792,572           Dated February 19, 1974

Inventor(s) Kenneth L. Turbin

It is certified that error appears in the above-identified patent and that said Letters Patent are hereby corrected as shown below:

Column 4, line 58, delete "system" and substitute --stream--.

Column 5, line 15, delete "94" and substitute --34--.

Column 6, line 17, delete "exchange" and substitute --exchanger-

Signed and sealed this 1st day of October 1974.

(SEAL)
Attest:

McCOY M. GIBSON JR.
Attesting Officer

C. MARSHALL DANN
Commissioner of Patents